Nov. 12, 1935.　　　　W. H. PARKER　　　　2,020,432

WIDE RANGE ORIFICE METER INSTALLATION

Filed July 23, 1931　　　2 Sheets-Sheet 1

Inventor
Walter H. Parker
By Strauch & Hoffman
Attorneys

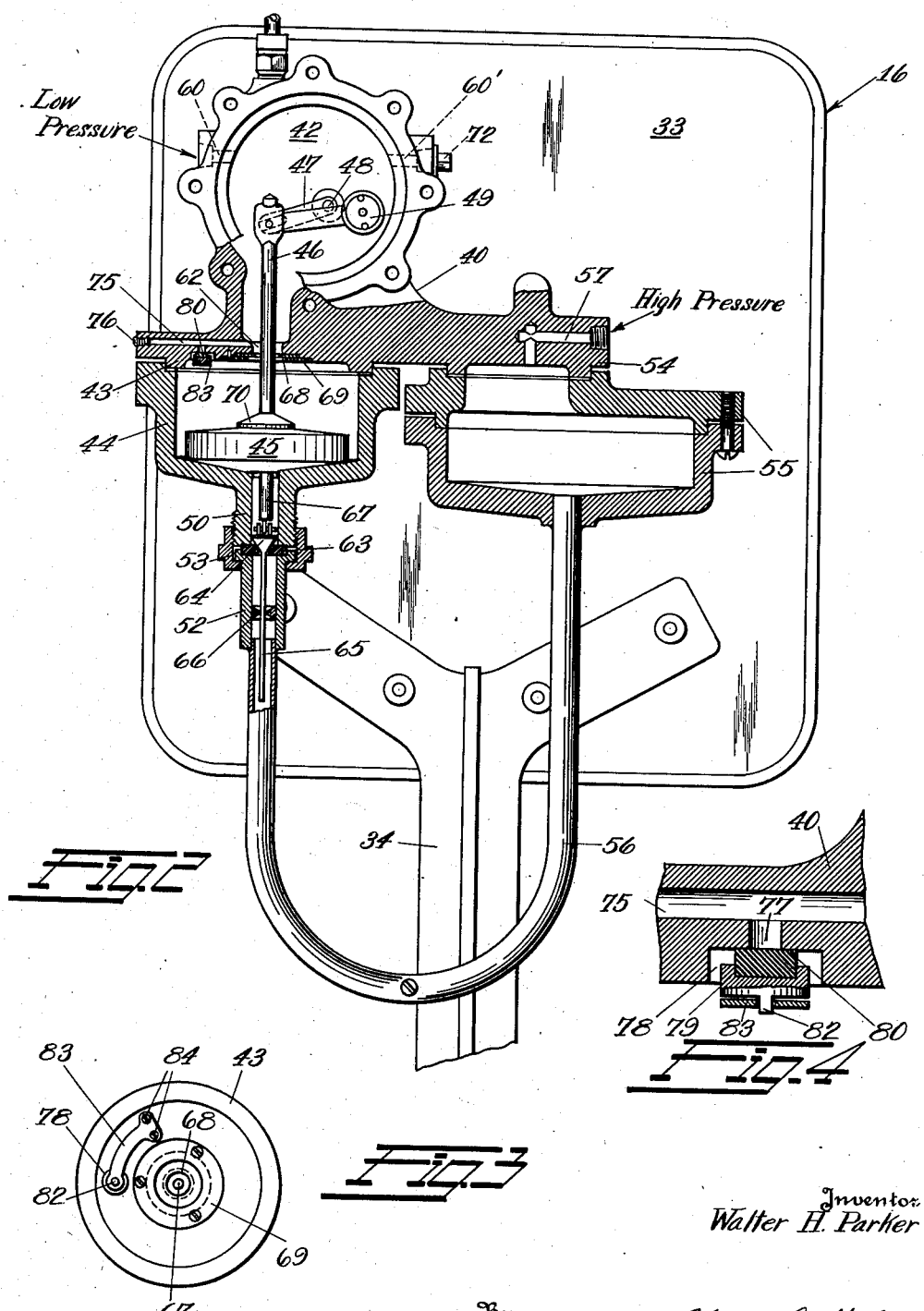

Patented Nov. 12, 1935

2,020,432

UNITED STATES PATENT OFFICE 2,020,432

WIDE RANGE ORIFICE METER INSTALLATION

Walter H. Parker, Pittsburgh, Pa., assignor to Pittsburgh Equitable Meter Company, Pittsburgh, Pa., a corporation of Pennsylvania Application July 23, 1931, Serial No. 552,732

14 Claims. (Cl. 73—167)

This invention relates to new and useful improvements in orifice meters used for measuring the flow of gases or liquids.

The present invention is especially concerned with a wide range orifice meter installation comprising a pair of recording gauges one of which is utilized to indicate low pressure differentials and the other to indicate differentials of relatively high value.

In the usual type of orifice meter there is a restriction in the fluid supply conduit, with pipes connected to the high and low pressure sides of said restriction (orifice), said pipes being connected to the corresponding high and low pressure chambers of a recording gauge. The latter comprises a U-tube containing liquid, such as mercury, joining the chambers; a float in one of the chambers; a time-controlled chart; and a pen for indicating pressure differentials on said chart in response to vertical movement of the float. The float usually is provided with a valve for sealing the communicating passage between the low pressure chamber and the U-tube at such time as the differential pressure has reached that maximum value which the gauge has been designed to indicate. This sealing action serves to prevent the mercury from being blown or otherwise forced out of the U-tube.

Due to the buoyancy of the mercury acting upon the float, and to the creation of a vacuum or relative vacuum in the low pressure chamber, there often is a tendency for the float valve to remain in the sealing position, just described, after the pressure differential has resumed a value below the maximum recordable value. This sticking tendency of course causes the pen to record a chart reading that is inaccurate throughout the period of time that the valve remains stuck. As a general rule it may be said that the better the seal is, the greater is the sticking tendency. A very effective seal may be obtained by utilizing a soft or non-metallic seat for the float valve, and it follows that there is a corresponding tendency for the valve to stick on such a seat.

It is the primary object of my invention to remedy the foregoing defect in orifice meters by providing them with means for rendering the float and valve immediately and accurately responsive to all differential variations within the range of the gauge design. I preferably accomplish this object through the utilization of an automatically controlled by-pass between the low pressure chamber and the U-tube.

The need for a relief device of this character is not great in a single meter provided that the meter is not employed on a line in which the pressure differential is subject to frequent increases above the maximum recordable value. It may be naturally assumed that, for any particular line, a meter will be selected which is capable of recording the average high flows through that line. The float valve and its seat are never dispensed with because they serve to protect the gauge against occasional excessive pressures during operation, and against improper valve manipulation during the installation of the meter.

However, in many installations the rate of flow normally varies to such an extent that a wide range meter must be used, and as a result of which use a large portion of the differential record is made at differentials so low that they are recorded at the center of the chart and hence difficult to read. To remedy this condition I provide a wide range installation comprising a single orifice and one set of high and low pressure pipes, but including two gauges one of which is designed to record differentials through the entire wide range and the other of which is designed to record only low differentials. The range of the latter may be about one-fifth of that of the other,— for example, 20" and 100" ranges respectively. As the differential increases from zero it is recorded on both charts, but within the 20" range, it is clearly readable only on the small range chart. When a 20" differential is reached the float valve of the low range gauge is closed, at which time the recording pen of the larger gauge has traveled one fifth of its stroke and its further recordations may be clearly read on its corresponding wide range chart. This passage beyond the 20" range may be referred to as "over-ranging".

When the differential returns to a value below 20" the float valve of the low range gauge should unseat in order to produce accurate recordations. As has been previously pointed out, the valve may stick and hence some method should be provided to ensure its proper operation at all times. It will be seen, therefore, that my relief or bypass device should be incorporated in every installation of this type, particularly where there is frequent over-ranging.

The foregoing and other objects of the present invention will clearly appear in the following detailed description when studied in connection with the accompanying drawings, wherein:

Figure 2 represents a rear elevational view, in partial section, of the low range (left-hand) gauge of Figure 1.

Figure 3 is a bottom plan view of that portion of the body casting of Figure 2, which forms the cover of the float chamber.

Figure 4 is an enlarged detail view, in the form of a fragmentary section, of the relief valve assembly of Figure 2.

Figures 5, 7:
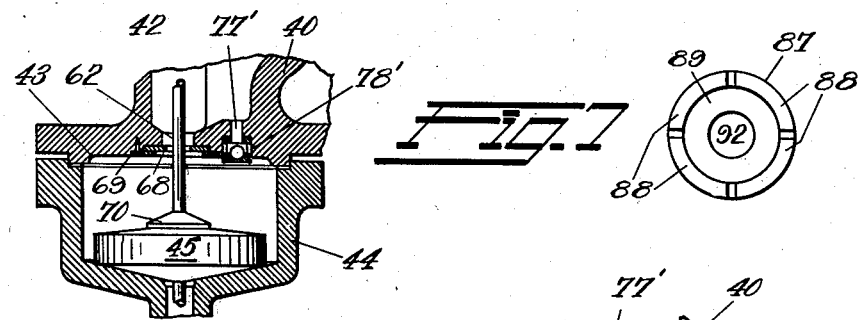

Figure 5, which represents a modified form of the invention is a somewhat irregular fragmentary section showing another type of relief valve assembly in a gauge structure like that of Fig. 2.

Figure 6:
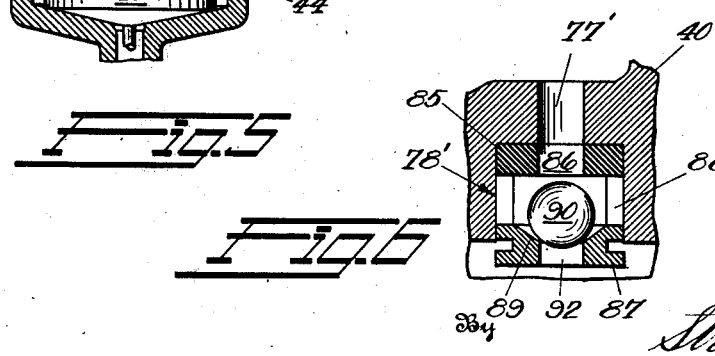

Figure 6 is an enlarged fragmentary section containing the relief valve assembly of Figure 5.

Figure 7 constitutes a top plan view of the ball cage of Figure 6.

Figure 1:
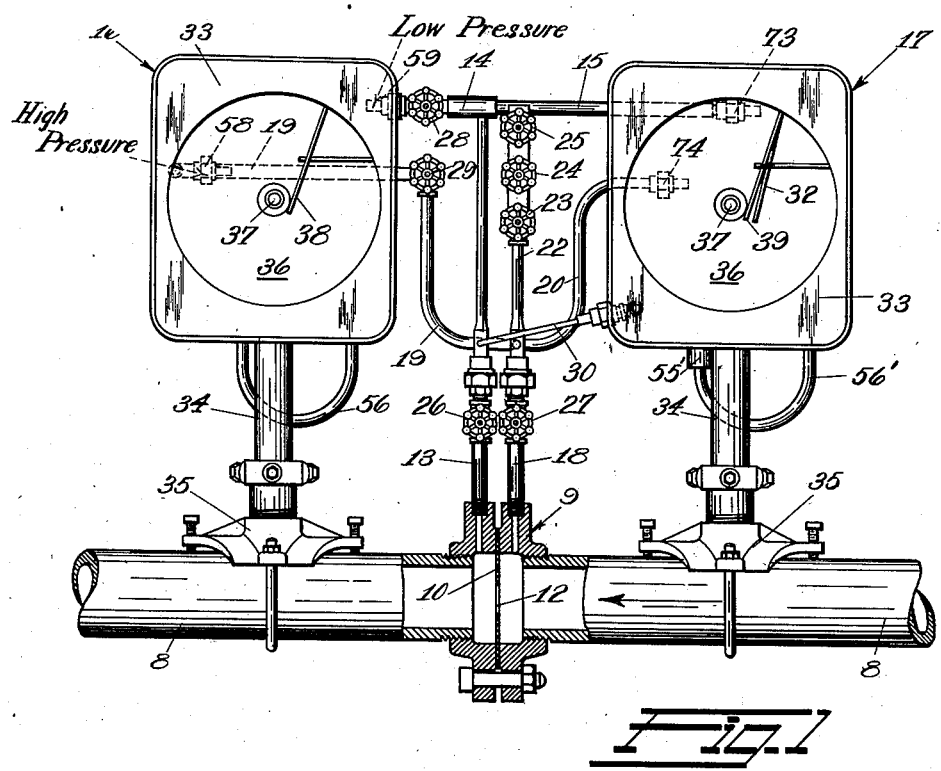
Figure 1 is a front elevational view of a wide range orifice meter constructed in accordance with the present invention and mounted in operative position upon a fluid conduit.

With continued reference to the drawings, wherein like numerals are employed to designate like parts, and with particular reference for the moment to Figures 1 and 2:

The fluid conduit 8 has an orifice assembly 9 inserted therein, which assembly includes a plate 10 apertured at 12. A pipe 13 is connected with the orifice assembly at the low pressure side of the plate, and has branches 14 and 15 for respective connection with a low range gauge assembly 16 and a wide range gauge assembly 17. A pipe 18 is connected into the high pressure side of the plate and has branches 19 and 20 connected with the gauges just mentioned.

The pipe 18 has a further branch or continuation 22 which communicates with branch 15, this branch 22 having three control valves 23, 24 and 25. In addition, the pipes 13 and 18 have valves 26 and 27 respectively, and the branches 14 and 19 have valves 28 and 29 respectively. All of these valves are provided for installation and test purposes and it will suffice to state here that normally the valves 23 and 25 are closed and all the others open. A pipe 30 may be employed to connect the pipe 13 with a static pressure instrument (not shown and forming no part of this invention) incorporated in the wide range gauge 17 so that the pan 32 of the latter may record static pressures.

Each of the gauges 16 and 17 comprises a casing 33 secured to a vertically adjustable stanchion 34 that is clamped upon the conduit 8 by a saddle assembly 35. Each casing may contain a clock for rotating a chart 36 that is centered upon a pin 37. Low and wide range pens 38 and 39 respectively are provided to make recordations on the charts. These pens move in response to pressure differentials in the following manner:

The low range gauge 16 includes, at its rear face (see Fig. 2) a main casting 40 secured to the casing 33 and designed to provide a low pressure chamber 42. The casting has a lower flange 43 to which is secured a float chamber 44 containing a float 45 having an upstanding stem or arm 46. The upper end of this stem is connected to an arm 47 secured to the pen shaft 48 of the pen 38. An automatic mechanism 49 is provided to compensate for angularity of the arm 47, this mechanism forming no part of the present invention. It, and several other features here shown somewhat diagrammatically, are fully disclosed in copending application Serial No. 433,110, filed March 4, 1930.

The lower end of the float chamber terminates in a nipple 50 to which a vertical sleeve 52 is secured by a union coupling 53. The main casting 40 has a second flange 54 to which is secured a high pressure chamber 55. This chamber 55 and the sleeve 52 are interconnected by a vertical U-tube 56 which has its open ends welded into sealed communication with the bottoms of the chamber and sleeve respectively. The U-tube and a portion of its related chamber space are filled with mercury or other suitable liquid. The casting 40 has a passageway 57 drilled therein for communication with the chamber 55 and for connection with a coupling assembly 58 carried by the high pressure branch 19 (see Figure 1). The low pressure branch 14 has a coupling member 59 for connecting it into communication with a passageway 60 that is drilled through the casting 40 into the low pressure chamber 42. The latter opens into the float chamber by way of an opening 62 through which the float stem 46 moves vertically without friction. It will thus be seen that the mercury will flow back and forth in the U-tube 56 in response to variations in the pressure differential across the orifice, and simultaneously impart vertical movement to the float to record the differentials.

Means are provided to prevent excessive high and low pressures from causing the mercury to leave the U-tube and its associated chambers, as follows:

A valve seat 63 is clamped between the sleeve 52 and the nipple 50, with which seat there cooperates a valve 64 having a stem 65 guided in a bearing 66. The valve is flexibly coupled to a rigid float arm 67 which is of such length that the valve is seated when the float is in its lowermost position. Above the float there is a washer-shaped seat 68 held in position at the lower end of the opening 62 by a ring 69. The upper side of the float has a central valve 70 rigid therewith and designed to cooperate with the seat 68 when the float is completely raised.

The wide range gauge 17 is of substantially the same construction as the gauge 16 just described and hence is not illustrated in detail. Its main casting preferably will be identical with the casting 40 in order that one standard part may serve in both gauges. It will be observed (see Figure 2) that a second drilled passage 60', closed by a plug 72, is provided in the casting. When using the casting in a wide range meter the plug may be transferred to the passage 60 and the passage 60' may be coupled, as at 73 (Fig. 1) with the low pressure branch 15. The high pressure branch 20 is simply connected to passage 57 by a coupling 74.

The wide range gauge must of course be designed to operate at higher differentials than the other gauge, and this may be accomplished merely by substituting for the high pressure chamber 55 of Fig. 2, a high pressure chamber 55' of greater length and lesser cross sectional area. This change requires a U-tube 56' of slightly different shape. Each high pressure chamber (55, 55') is designed to fit the standard flange 54 of the casting 40. It should be understood that, in individual gauges as well as in the wide range installation, the recordation range may be varied at will by selection of a high pressure chamber of proper proportion.

In the illustrated wide range installation let it be assumed that the chamber 55 is designed for a maximum differential pressure of 20" and that the other chamber, 55' is designed for 100". All differentials below 20" will be recorded on both gauges, but will be read on the low range instrument 16 because it would be difficult to obtain an accurate reading of such low values on the 100" instrument. However when 20" is exceeded the mercury in float chamber 44 raises the float and forces the float valve 70 against its seat and similarly the rising mercury forces the rubber check valve 80 to close, thereby closing communication between the float chamber 44 and low pressure chamber 42 and rendering the indicator inoperative, and the higher differentials are now read on the wide range chart.

When the differential pressure drops below 20" the float valve 70 should unseat and allow the float to descend through a distance corresponding to the pressure drop. However, in actual practice it may happen that the valve will not immediately unseat thus preventing the float from descending, with the result that the recordation will be inaccurate throughout that period of time that the valve is stuck. This sticking tendency is especially noticeable when the pressure differential drops only a slight amount below 20", and also where a composition or soft seat 68 is utilized (as in the illustrated preferred form). This lack of responsive sensitivity probably is due to the fact that the valve, buoyed up with the float by the mercury, forms so effective a seal on its seat that relatively small increments of differential variation cannot unseat it to permit the pressure of chamber 42 to be tranmitted to the top of the float and to the mercury surface in chamber 44. Rather than remedy this condition by utilizing a less efficient seal (which might permit mercury to be blown or forced into chamber 42), the following auxiliary means is provided:

As seen in Figures 2, 3 and 4, a hole 75 is drilled through the casting 40 into the chamber 42, and the outer end of this hole is closed by a plug 76. A second hole 77 is provided to form, with the other, a passageway providing a relief or by-pass between the chambers 42 and 44. A recess 78 is cut below the hole 77 to receive a check valve assembly comprising a cup 79 carrying a rubber valve 80 that may seat against the casting 40 to close the hole 77. The cup 79 has a stem 82 set into one end of a flat spring 83, the other end of which is secured to the casting 40 by screws 84. The spring preferably is given a slight normal tendency to flex downwardly into a position corresponding to an open valve position.

In the foregoing arrangement it will be observed that the check valve normally is open throughout the range of operation of the gauge, but that it will become closed upon sudden or gradual excessive increases in the pressure differential which cause the mercury to rise high enough to seat the valve 70 thereby closing passage 62 and causing a sudden increase in flow of gas through by-pass 77 as the mercury continues to rise which closes valve 80. When the valve 70 is seated and the differential thereafter falls below 20", the spring 83 causes the valve 80 to open thereby immediately producing a high pressure differential on opposite sides of valve 70 which forces the valve free from its seat and renders the float operative again.

A modified, and preferred, form of by-pass arrangement is disclosed in Figures 5, 6 and 7, wherein the drilled hole 75 is eliminated by disposing the relief valve directly below a portion of the chamber 42. In this form, a vertical hole 77' and a recess 78' are provided in the casting. A composition ring 85 is cemented in place in the upper end of the recess with its central aperture 86 aligned with the hole 77'. A valve cage 87, having a set of upstanding spaced walls 88, is fitted into the recess in engagement with the ring 85. The cage has a seat 89 upon which normally rests a ball valve 90. The seat converges into a hole 92 opening into the float chamber. Preferably the cage is coated with a composition and the ball is made of stainless steel, this being done to prevent corrosion.

In the embodiment just described, the ball 90 normally rests upon the seat 89 but will be thrust upwardly to close the aperture 86 when the mercury in chamber 44 rises high enough to cause the valve 90 to float. When the level of the mercury drops sufficiently the ball will drop back for support on the seat 89. The fit between the ball 90 and retaining seat 89 is not close so that air can pass between them from the chamber 42 to chamber 44.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:—

1. In a wide range orifice meter installation, a low range indicator designed to indicate differential pressures up to a predetermined maximum differential value, and a separate high range indicator responsive to differential pressures from said predetermined maximum value, said low range indicator including a pressure-responsive unit and means operated by the pressure-responsive unit for limiting the operation of said unit upon the attainment of said predetermined maximum value to prevent injury to the low range indicator, and pressure-responsive means for ensuring operation of said unit when the pressure differential has passed below said predetermined maximum value.

2. In a differential pressure indicator including a float member responsive to the combined effect of two fluid pressures, protecting means associated with said float member for preventing further response of said indicator when a predetermined maximum pressure differential has been reached, and pressure-responsive means associated with said protecting means for automatically ensuring a resumption of the response of the indicator upon decrease of the pressure differential to a value below said maximum differential.

3. In a differential pressure gauge, a pressure-responsive unit containing a column of liquid, connections for supplying high and low pressure fluids to the respective ends of said column of liquid, means operable to seal one end of said column from its corresponding connection when the pressure differential exceeds a predetermined value, and a by-pass independent of said means and having a fluid pressure governed valve therein to ensure breakage of said seal whenever the pressure differential again falls below said predetermined value.

4. In a differential pressure gauge, a pressure-responsive unit comprising high and low pressure fluid chambers, a float chamber in communication with said low pressure fluid chamber, a float in said float chamber, a valve carried by said float and operable when the pressure differential has reached a predetermined maximum value to close the communication between said float chamber and said low pressure chamber, and auxiliary pressure controlled valve means for ensuring the reopening of said float carried valve when the differential pressure descends below said predetermined value.

5. In a differential pressure gauge, a pressure-responsive unit containing a column of liquid, connections for supplying high and low pressures to the respective ends of said column including a passageway between the low pressure connection and the respective end of said liquid column, indicating means dependent on the liquid level of the column, a pressure-responsive valve assembly associated with said passageway for closing said passageway when the pressure differential reaches a given maximum, and means closed by relatively excessive pressure and adapted to permit release of said valve for opening when the differential falls below said maximum.

6. In a differential gauge, a pressure-responsive unit containing a column of liquid, connections for supplying high and low pressures to the respective ends of said column, including means forming a passageway between the low pressure connection and the respective end of said liquid column, indicating means and an automatic pressure-responsive valve assembly independent of the indicating means and associated with the passageway for closing said passageway when the pressure differential reaches a given maximum, said valve assembly comprising a seat at that end of the passageway adjacent the liquid column, a second seat spaced from the first mentioned seat, and a ball valve designed to cooperate with both of said seats.

7. In a differential pressure gauge the combination of a low pressure chamber, means for transmitting a low pressure thereto, a high pressure chamber, means for transmitting a high pressure thereto, a conduit for containing liquid interconnecting said chambers, a float in the low pressure chamber, a valve operated by the float for closing off the pressure transmitting means thereto when the differential pressure reaches a predetermined maximum, a by-pass between the low pressure chamber and the pressure transmitting means, a closure adapted to close the by-pass when the pressure reaches the predetermined maximum, and means for displacing said closure to open the by-pass when the differential pressure falls below said maximum.

8. In a differential pressure gauge, a pressure-responsive unit containing a column of liquid, means for transmitting high and low pressures to the respective ends of said column and including means forming a passageway between the low pressure means and the respective end of said liquid column, a pressure operated automatic valve assembly to prevent overranging of said unit comprising a seat fitted at that end of the passageway adjacent the liquid column, and a sealing element designed to seat thereagainst when the pressure differential reaches a given maximum, and a by-pass having a pressure operated valve therein to establish an unseating differential when the pressure falls below a predetermined maximum.

9. In a wide range orifice meter installation, a low range gauge comprising a column having liquid therein, a high range gauge comprising a second column having liquid therein separate from that in the first mentioned column, a float chamber in the low range gauge, a float in said chamber operated by the heighth of the liquid in the column, conduits for transmitting high and low pressures to each of said respective columns, and a valve operated by a predetermined height of liquid in the low range column for preventing excessive rise of liquid therein, a by-pass between the float chamber and its conduit and having a pressure operated valve therein adapted to be unseated to open said by-pass when the height of liquid falls below a predetermined level.

10. In a differential pressure gauge the combination of a low pressure chamber, means for transmitting a low pressure thereto, a high pressure chamber, means for transmitting a high pressure thereto, a tube for containing liquid interconnecting said chambers, a float in the low pressure chamber, a valve operated by the float for closing off the pressure transmitting means thereto when the differential pressure reaches a predetermined maximum, a by-pass between the chamber and the pressure transmitting means, and a closure in the by-pass adapted to close when the differential pressure reaches a predetermined maximum and to be opened when the differential pressure falls below said maximum.

11. In a differential pressure gauge, a pressure-responsive unit comprising high and low pressure fluid chambers, a float chamber having a float therein in communication with said pressure chambers, a valve carried by said float and operable to seat in a passage to close communication between the float chamber and the low pressure chamber when the pressure differential between said chambers reaches a predetermined maximum value, said seat being formed of a relatively soft material, and auxiliary pressure operated valve means for ensuring the reopening of said float carried valve when the pressure differential descends below maximum value.

12. In a differential pressure gauge, a pressure-responsive unit containing a column of liquid, means for supplying high and low pressures to the respective ends of said column and including means forming a passageway between the low pressure source of supply and the respective end of said liquid column, a pressure operated automatic valve assembly comprising a sealing element designed to seat against that end of the passageway adjacent the liquid column when the pressure differential reaches a given maximum and a spring having a normal tendency to unseat said element.

13. In a differential pressure gauge, a pressure responsive unit including a column of liquid, connections for applying a differential pressure to the ends of said column, a float in said liquid column, an indicator operated by said float, means for limiting movement of said float when the pressure differential exceeds a predetermined maximum and for sealing the liquid column from its connection, a by-pass around said means, a fluid operated valve therein adapted to close at relatively excessive pressures, and means normally tending to open said valve to instantly restore the pressure differential when said differential falls below a predetermined value.

14. In a differential pressure gauge, a pressure responsive unit containing a column of liquid, means for transmitting high and low pressures to the respective ends of said column and including means forming a passageway between the low pressure means and the respective end of said liquid column, a fluid pressure operated valve assembly to prevent overranging of said unit comprising a relatively soft non-metallic seat fitted at that end of the passageway adjacent the liquid column, and a sealing element designed to seat thereagainst when the pressure differential reaches a predetermined maximum and a by-pass having a valve therein to establish an unseating differential when the pressure falls below a predetermined maximum.

WALTER H. PARKER.